(12) United States Patent
Vélez et al.

(10) Patent No.: US 7,348,583 B2
(45) Date of Patent: Mar. 25, 2008

(54) WAVELENGTH STABILIZED LIGHT SOURCE

(75) Inventors: Christian Vélez, Richterswil (CH); Lorenzo Occhi, Pfäffikon (CH); Christopher Armistead, Meilen (CH)

(73) Assignee: Exalos AG, Zürich (CH)

( * ) Notice: Subject to any disclaimer, the term of this patent is extended or adjusted under 35 U.S.C. 154(b) by 311 days.

(21) Appl. No.: 11/265,042

(22) Filed: Nov. 2, 2005

(65) Prior Publication Data
US 2007/0096042 A1    May 3, 2007

(51) Int. Cl.
*G01J 3/10* (2006.01)
*H01L 31/00* (2006.01)

(52) U.S. Cl. .................. 250/504 R; 250/495.1; 250/365; 257/21; 257/82; 372/4

(58) Field of Classification Search ............... None
See application file for complete search history.

(56) References Cited

U.S. PATENT DOCUMENTS

| | | | |
|---|---|---|---|
| 5,691,989 A | 11/1997 | Rakuljic et al. | |
| 5,812,716 A | 9/1998 | Ohishi | |
| 6,359,918 B1 | 3/2002 | Bielas | |
| 6,728,285 B2 * | 4/2004 | Hayakawa | 372/92 |
| 6,879,610 B2 | 4/2005 | Alphonse et al. | |
| 7,019,325 B2 * | 3/2006 | Li et al. | 257/14 |
| 2002/0149312 A1 | 10/2002 | Roberts et al. | |
| 2003/0147448 A1 | 8/2003 | Hayakawa | |

FOREIGN PATENT DOCUMENTS

| | | |
|---|---|---|
| DE | 103 07 524 A1 | 9/2004 |
| JP | 2005072141 | 3/2005 |

OTHER PUBLICATIONS

WO 99/66612, "Superluminescent Diode and Optical Amplifier With Wavelength Stabilization Using WDM Couplers and Back Output Light," Jun. 16, 1999.
WO 02/052755A2, "Method and Apparatus for Stabilizing A Broadband Source," Dec. 14, 2001.
WO 99/37975, "Method and Device for Stabilizing the Scale Factor of a Fiber Optic Gyroscope," Jan. 21, 1998.
WO2004074774. "Highly Stable Broadband Light Source and Suitable Stabilization Method Therefor," Sep. 2, 2004. (English Abstract for DE 103 07 524 A1).

* cited by examiner

*Primary Examiner*—Nikita Wells
(74) *Attorney, Agent, or Firm*—Rankin, Hill, Porter & Clark LLP

(57) ABSTRACT

An apparatus for producing wavelength stabilized electromagnetic radiation is provided, the apparatus comprising a broadband semiconductor radiation source configured to produce broadband electromagnetic radiation having a mean wavelength $\lambda_m$, and a bandpass radiation filter, an input of said bandpass radiation filter being in optical connection to an output of said radiation source, and a common temperature stabilizer being in thermal contact with both, the radiation source and the radiation filter. In a preferred embodiment, the radiation source—which is, for example, a superluminescent light emitting diode—and the bandpass radiation filter are provided on a common mount which is in contact with a thermoelectric cooler acting, together with temperature sensing means and control means, as temperature stabilizer.

15 Claims, 3 Drawing Sheets

WAVELENGTH STABILIZED LIGHT SOURCE

FIELD OF THE INVENTION

The present invention relates generally to wavelength stabilized broadband electromagnetic radiation sources and methods of wavelength stabilization of electromagnetic radiation sources and more in particular to Superluminescent Light Emitting Diodes (SLEDs) with enhanced mean wavelength stability.

BACKGROUND OF THE INVENTION

Many fiber optic gyroscopes (FOG) use a broadband light source to provide the light that is introduced into a fiber-sensing coil for rotation detection. The induced phase shift between the counter propagating light waves injected in the fiber coil is proportional to the rotation rate. The proportionality constant, called "scale factor", is proportional to the average, or mean, wavelength of the light source. Hence the accuracy of the gyroscope is determined by the accuracy by which the average wavelength of the light source is known.

Wavelength stabilization of the optical source has been accomplished by using a wavelength stabilization circuit (WO99/66612). Such a circuit comprises a first wavelength division multiplexer (WDM) which splits the output light of the SLED received via the optical fiber into a first band equal to a full width half maximum (FWHM) SLED bandwidth, and a second band containing a residual spectrum containing two side lobes. It also comprises a second WDM which separates the residual spectrum into a lower half centered around $\lambda 1$ and an upper half center around $\lambda 2$, optical detectors, and a differential amplifier responsive to the upper and lower halves so as to provide and output error signal when the upper and lower halves are not equal which is used in a feedback loop to actively control the wavelength.

Another active wavelength stabilization process is proposed in WO02/052755. The method and system are based on utilizing an optical power divider to generate two optical signals for the broadband source and a reference wavelength source. Because component aging and changes in environmental factors similarly affect the power ratios, the difference in the power ratios can be used to adjust the wavelength of the broadband source so that its center wavelength is stabilized to the center wavelength of the reference source.

An alternative approach that is more convenient to implement is described in WO99/37975. According to this disclosure, the emission bandwidth irradiated from the light source into a fiber end is to be limited to a narrower transmission bandwidth in the wavelength area of the intensity characteristic curve of the light by a narrow-band optical filter. The temperature of the filter is measured and temperature dependence of the transmission characteristics can be quickly corrected during use of the optical interference filters by means of a pre-calibrated look-up table. The readjusted wavelength value is used for calculating the scale factor.

Another approach is described in DE10307524 and WO2004074774. According to this approach, light from a superluminescent diode is coupled via a coupling element into one or two temperature stabilized bandpass filters.

All these approaches have in common that they require a relatively complicated set-up using accordingly relatively expensive components and/or a high computation power to numerically compensate inaccuracies and/or bring about high losses, which makes a solution with a small form factor and no additional electronics difficult to realize.

SUMMARY OF THE INVENTION

Accordingly, it is an object of the invention to provide an inherently wavelength stable electromagnetic radiation source, which is reliable and may be manufactured at low cost. Preferably, the electromagnetic radiation source should be such as to make embodiments with a small form factor and low power consumption possible. Also, preferably only a minimum in electronic components should be necessary.

In a first aspect, the invention relates to an apparatus for producing wavelength stabilized electromagnetic radiation, the apparatus comprising a broadband semiconductor radiation source configured to provide broadband electromagnetic radiation having a mean wavelength $\lambda_m$, and a bandpass radiation filter, an input of said bandpass radiation filter being in optical connection to an output of said radiation source, and a common temperature stabilizer being in thermal contact with both the radiation source and the radiation filter. In a preferred embodiment, the radiation source, which is, for example, a superluminescent light emitting diode, and the bandpass radiation filter are provided on a common mount which is in contact with a thermoelectric cooler acting, together with temperature sensing means and control means, as a temperature stabilizer.

In a second aspect, the invention relates to a system for generating electromagnetic radiation comprising a package of a superluminescent light emitting diode operable to emit primary electromagnetic radiation with a first bandwidth and a band pass filter capable of filtering the primary radiation to yield secondary radiation with a second bandwidth, which is smaller than the first bandwidth, an input of the band pass filter being optically coupled to an output of the superluminescent light emitting diode, the package being thermally coupled to a thermoelectric cooler, the system further comprising a temperature sensor being in thermal contact with the package and a controller operable to control the thermoelectric cooler based on signals input from the temperature sensor.

The packaging of the radiation source and the radiation filter on a common temperature stabilizer, preferably a controlled thermoelectric cooler, has the advantage of providing a reliable but simple and low-cost solution to the problem of wavelength stabilization. In the preferred case where the radiation source is a superluminescent light emitting diode, a temperature stabilizer in the form of a controlled thermoelectric cooler is present anyway, and the additional hardware needed for providing an apparatus according to the invention is merely a bandpass radiation filter and a suitable mount. This is in contrast to state-of-the-art solutions where either a computing stage (which also necessitates an analog-to-digital transducing stage) or a plurality of other optical elements are necessary.

"Light" in the context of this document refers to electromagnetic radiation, in particular electromagnetic radiation that can be produced by injecting current in a semiconductor heterostructure, including infrared light (especially in the near infrared, wavelengths above the visibility threshold and below 5 µm, and mid infrared region), visible light, and also ultraviolet radiation.

The invention allows manufacturing light sources with an inherent wavelength stability in the order or 10 parts per million (ppm) or better. This wavelength stability is more than two orders of magnitudes better than standard broadband semiconductor based light sources, e.g. SLED, having 250 to 400 ppm. The invention also will allow replacement of expensive fiber based fiber broadband sources like Erbium Doped Fiber Amplifiers (EDFA's).

BRIEF DESCRIPTION OF THE DRAWINGS

In the following, embodiments of the invention are described with reference to drawings. All drawings are schematic and not to scale. In the different drawings, corresponding elements are provided with same reference numerals.

DESCRIPTION OF THE PREFERRED EMBODIMENTS

Figure 1:
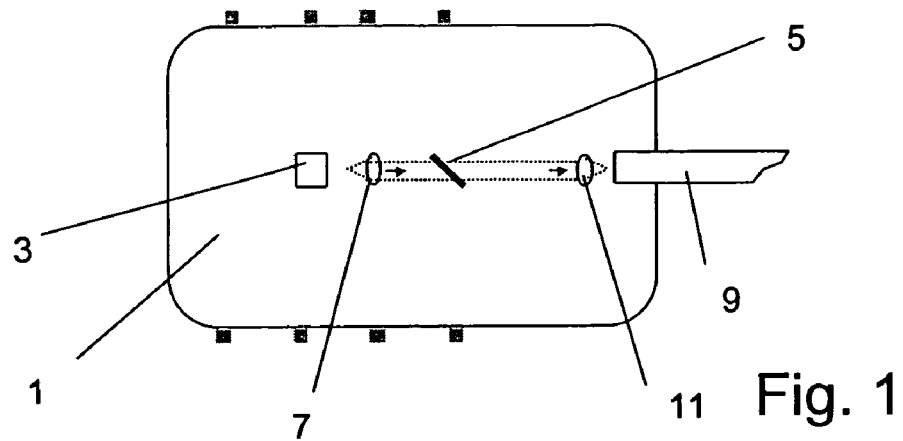
FIGS. 1 and 1a show a schematic top plan view of an apparatus according to the invention.

The apparatus according to FIG. 1 comprises a mount 1, on which a broadband radiation source 3 is arranged, namely, a superluminescent light emitting diode (SLED). Superluminescent light emitting diodes (SLEDs) are diodes that, when biased in the forward direction, become optically active and generate amplified spontaneous emission over a wide range of wavelengths. In contrast to laser diodes, there is not sufficient feedback to achieve lasing action ("lasing" referring the function principle of a laser, i.e. to generate, by a feedback, stimulated emission in a gain medium pumped to provide population inversion and placed in a cavity providing the feedback, resulting in coherent radiation). Superluminescent light emitting diodes exist in a large variety of types. All kinds of superluminescent light emitting diodes are suited as radiation sources for an apparatus according to the invention, as long as the conditions concerning the spectral composition of the emitted radiation (see below) are fulfilled.

The apparatus further comprises a bandpass radiation filter 5 being arranged downstream (relating to the light path of radiation emitted by the radiation source) of the light source. The filter transmission characteristics shall ideally have a Gaussian shape, i.e. a spectra which can be approximated with a Gauss function. This avoids unwanted structure or peaks in the coherence function of the SLED. In the figure a first collimation optics 7 (for example comprising a refractive and/or diffractive lens) for optimizing the coupling of radiation output by the source into the filter. There exists a large variety of optical bandpass filters, and the invention is not limited to a specific type of optical bandpass filter. Often, optical bandpass filters comprise a stack of dielectric layers with different indices of refraction and base on the principle of interference. They include Fabry-Perot-interferometers, Bragg gratings, and also arrayed waveguide gratings etc. Since the wavelength characteristics of the interference effect depends on the exact dimensions of the involved materials (for example the thickness of the dielectric layers), it is, due to thermal expansion, and possibly other effects such as temperature dependent absorption etc., also dependent on the temperature. The apparatus is capable of coupling radiation transmitted through the filter 5 into a fiber 9 suitable for directing the radiation into a fiber optic gyroscope (FOG). The fiber 9 may be a single mode fiber (SMF), a polarization maintaining fiber or a multi-mode fiber. Of course, the fiber 9 may be directly the fiber of a FOG, which comprises a wound section. Also, shown in the drawing is a second collimation optics 11, which also may comprise at least one refractive and/or diffractive lens for optimizing the coupling of radiation from the filter 5 into the fiber 11.

Figure 2:
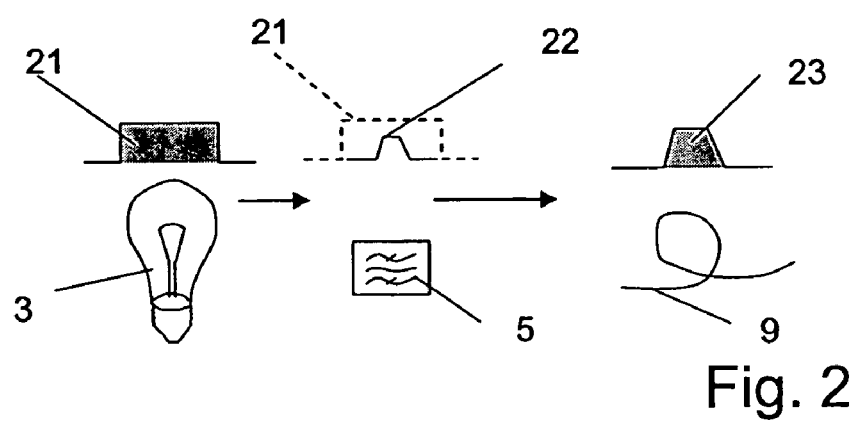
FIG. 2 is a schematic representing the spectral composition of primary radiation and filtered radiation in accordance with the invention.

The emission characteristics of the light source and the transmission characteristics of the filter have to be adapted to each other. The condition is that the transmission band of the filter is within the emission band of the light source. This is illustrated in FIG. 2. The spectral composition 21 (i.e. the intensity of emitted radiation as a function of wavelength or frequency) of the radiation emitted by the light source 3 is such that the transmission bandwidth of the filter is narrower preferably much narrower, i.e. there is a large ratio between the light source bandwidth and the filter bandwith. The spectral composition of the transmitted radiation 23 is then essentially determined by the filter transmission characteristics 22.

Figure 1A:
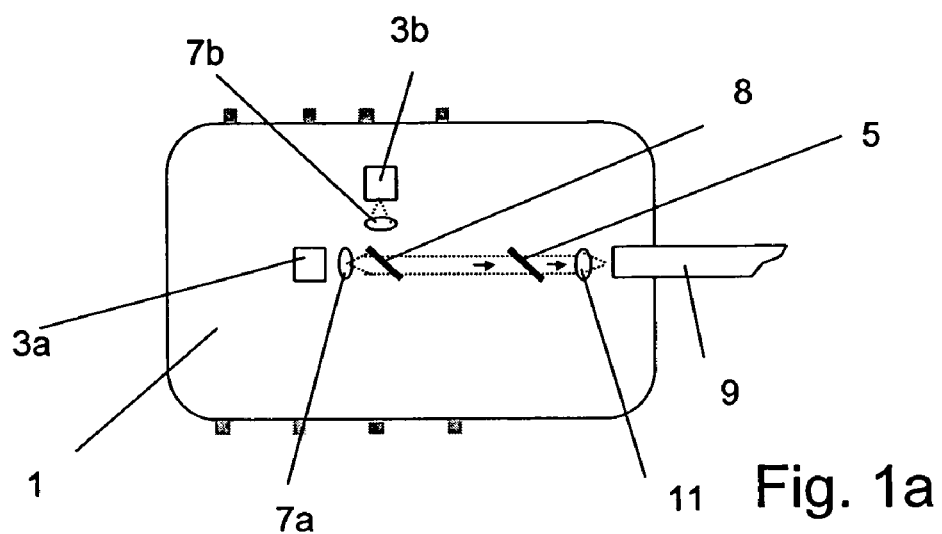

A mean wavelength stability in the order of 10 ppm can, for example, be achieved if the SLED bandwidth is at least 5 times larger than the filter bandwidth. To achieve this condition a SLED having a large bandwidth, e.g. >100 nm is required. One possible way of achieving this is by combining the light of two SLED's as shown in FIG. 1a. The embodiment of FIG. 1a is distinct from the one of FIG. 1 in that it comprises a first 3a and a second 3b SLED chip, which are for example similar in performance but have a mean emission wavelength shifted with respect to each other. Each of the chips 3a, 3b includes a collimation optics 7a, 7b. By including a second SLED 3b, having a shifted wavelength compared to the first one, a large enough total bandwidth can be obtained. Radiation emitted by the SLED chips 3a, 3b is incident on a wavelength coupler 8, from where the coupled radiation propagates to the filter 5. In this embodiment, the two SLED chips (in fact, also more than two SLED chips with different emission characteristics could be used) together with the wavelength coupler constitute the light source, the light of which is coupled into a single filter 5.

Figure 3:
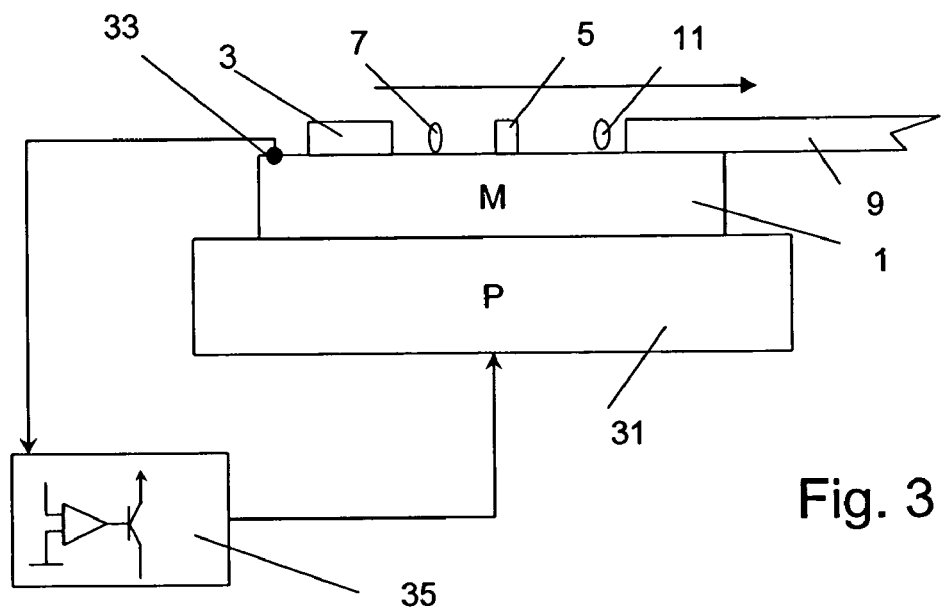
FIG. 3 is a schematic lateral view of an apparatus according to the invention.

In accordance with the invention, the light source 3 and the bandpass filter 5 are in thermal contact with a common temperature stabilizer. FIG. 3 illustrates this. The common mount 1 is provided on a thermoelectric cooler 31. The mount 1 is of a dimension and material composition that makes it a good thermal conductor. For example, it may be a thin interconnect (for example with a thickness below 400 µm) comprising wiring for the light source power supply) on an also relatively thin (for example below 1 mm) carrier element made of copper, silver, tungsten, a copper/tungsten alloy or any other material, preferably with a high thermal conductivity. The thermoelectric cooler may for example be a Peltier cooler of a kind that presently is used for temperature stabilizing SLED devices or may be any other suitable device. The light source 3 and the filter 5 are, via the mount, also in thermal contact with a temperature sensor 33, which may comprise a thermistor, a thermocouple, a resistance temperature detector, a bimetallic thermometer or thermostat, a semiconductor thermometer device (potentially even integrated with the light source or with a substrate of the light source and/or bandpass filter), a sensor comprising a plurality and/or a combination of these or any other contact or even non-contact temperature sensor. The temperature sensor is communicatively coupled to a controller 35 which controls the thermoelectric cooler, for example by controlling the electric power supplied to it. The controller may comprise an (integrated or non-integrated) circuit capable of maintaining the sensor temperature constant. Such circuits or digital equivalents thereof are known in the art and will not be described in detail here.

By the configuration described with reference to FIG. 3, it is possible to readily stabilize the temperature with a precision of below 0.1° C., which is the necessary precision.

Figure 4:
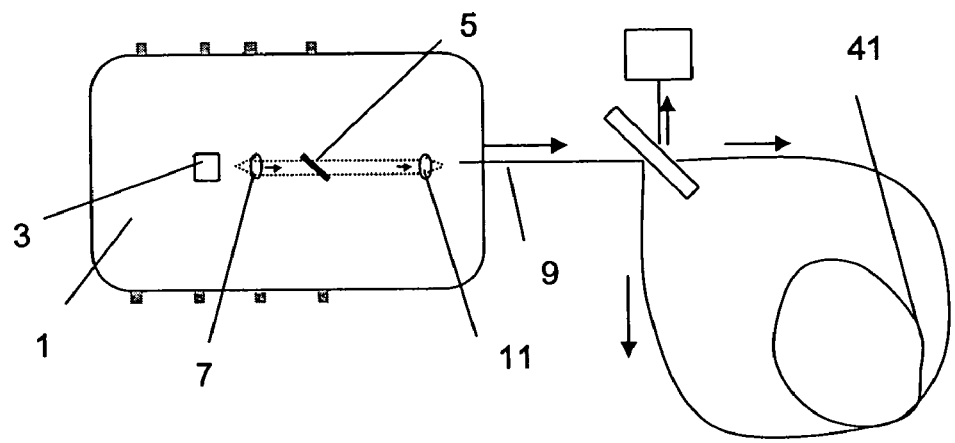
FIG. 4 schematically shows a system according to the invention which includes a Fiber Optic Gyroscope.

FIG. 4 also very schematically illustrates a system according to the invention, which system includes at least one apparatus of the kind described above, i.e. at least one apparatus comprising a temperature stabilized package with at least one light source and at least one bandpass filter. The shown system further includes a coil 41 of a wound up, usually very long, i.e. up to 1 km or longer, optical fiber, a beam splitter 43 and an optical detector which together make up a component of a fiber optic gyroscope. A fiber optic gyroscope comprises these components in order to determine the rotation rate. In the drawing, only one apparatus and one fiber coil is shown, however, a fiber optic gyroscope in practice will often have a plurality of these and other components in order to address rotations (and possibly ultimately also orientations) with respect to different rotation axes so as to have information on different rotation degrees of freedom in space.

Figure 5:
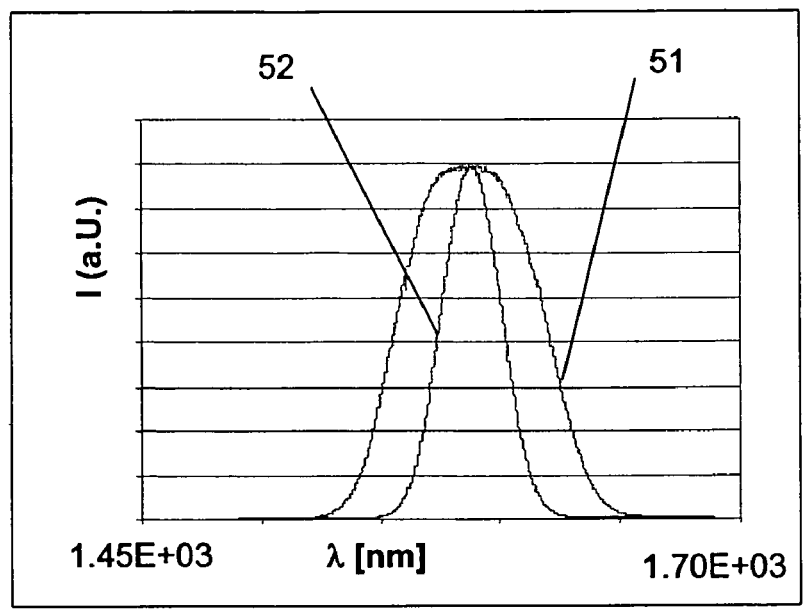
FIG. 5 shows a measured spectrum.

FIG. 5 shows an example of a measured spectrum of light produced by a SLED 51 light source 51 (having a central wavelength of about 1.58 μm), and of the light after passing of a 30 nm bandpass filter 52. The used light source is an EXALOS SLED with part number EXS5810-2101 having a flat-top spectra with >65 nm 3 dB optical bandwidth. Since the broadband light source spectrum 51 is comparably flat near the intensity maximum, shifts of its mean wavelength, which may for example occur due to aging effects, temperature and/or current fluctuations do essentially not effect the properties of the spectrum of the light 52 behind the filter.

More in general, the ideal properties of the primary light output by the SLED are "broadband" and "flattop".

Figure 6:
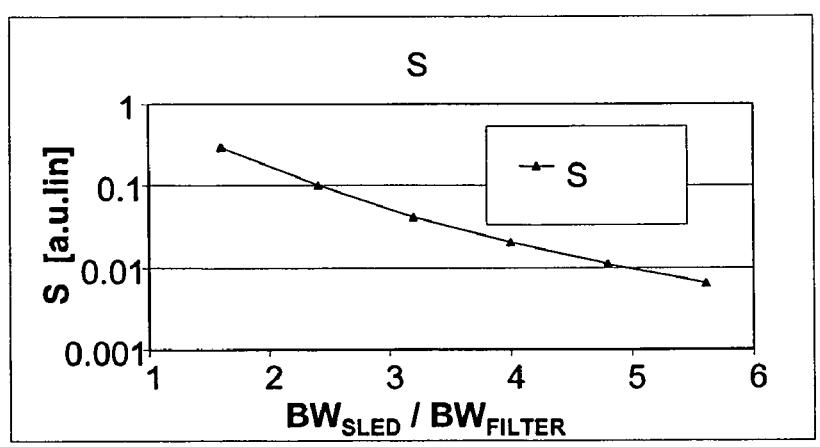
FIG. 6 shows a simulated dependence of the maximum mean wavelength on the primary light source emission bandwidth.

FIG. 6 shows the simulated dependence of the maximum mean wavelength shift S (in arbitrary units) as a function of the ratio between the SLED emission bandwidth and the filter bandwidth for the configuration of a SLED radiation source followed by a bandpass filter of the same mean wavelength. From the figure it becomes clear that a SLED bandwidth at least five times larger than the filter bandwidth is required to reduce the mean wavelength shift by at least two orders of magnitude, for example from 250 ppm down to 10-20 ppm.

A "flat top optical spectrum" denotes any optical spectrum produced by an optical source, which has a flat characteristic around the spectrum mean wavelength $\lambda_m$. A flat characteristic is given when within a wavelength span of $\Delta\lambda$ the spectral power variation is lower than a given value called Ripple. The smaller the value of Ripple and the larger $\Delta\lambda$ the flatter is the spectrum. An example of flat spectra is for instance the shape, which follows a Supergaussian function, i.e.

$$P(\lambda)=P_0 \exp(-((\lambda-\lambda_m)/(2\sigma)^{2M}), M>1.$$

The larger the value of M, the flatter the spectrum. The most ideal flat spectrum is, of course, a simple square function.

For practical application, a spectrum with $\lambda_m=1300$ nm, $\Delta\lambda=100$ nm and Ripple=0.5 dB is considered as flat. More in general, a flattop spectrum is achieved if $\Delta\lambda/\lambda_m>0.05$ and a Ripple smaller than 0.8 dB, preferably $\Delta\lambda/\lambda_m>0.07$ with a Ripple equal to or smaller than 0.5 dB.

Light sources having such flattop spectra are for example SLED light sources with EXALOS part numbers EXS5810-2101 or EXS1320-2101. A teaching concerning flattop spectrum light sources can for example also be found in: Chin-Fuh Lin, Yi-Shin-Su, Chao-Hsin Wu and Gagik S. Shmavonyan, "Influence of Separate Confinement Heterostructure on Emission Bandwidth of InGaAsP Superluminescent Diodes/Semiconductor Optical Amplifiers with Nonidentical Multiple Quantum Wells", IEEE Phontonics Technology Letters, Vol. 16, No. 6, June 2004, p. 1441-1443.

Although the invention neither limited to broadband nor to flattop light spectra, the invention works especially well with light sources producing these kind of spectra.

What is claimed is:

1. An apparatus for producing wavelength stabilized electromagnetic radiation, the apparatus comprising a broadband semiconductor radiation source configured to provide broadband electromagnetic radiation having a mean wavelength $\lambda_m$, and a bandpass radiation filter, an input of said bandpass radiation filter being in optical connection to an output of said radiation source, and a common temperature stabilizer being in thermal contact with both, the radiation source and the radiation filter.

2. The apparatus according to claim 1, the temperature stabilizer comprising a thermoelectric cooler, a temperature sensor being in thermal contact with the radiation source and the radiation filter and a controller an input of which is operatively connected to the temperature sensor and an output of which is operatively connected to the thermoelectric cooler.

3. The apparatus according to claim 2, wherein the controller comprises an analog electronic control circuit and is absent any analog-to-digital conversion stage.

4. The apparatus according to claim 2, wherein the controller comprises a digital signal processing unit.

5. The apparatus according to claim 1 further comprising a mount, the radiation source and the radiation filter being mechanically connected to said mount, the mount being in thermal contact with the temperature stabilizer.

6. The apparatus according to claim 5, the temperature stabilizer comprising a thermoelectric cooler, the mount being mounted on the thermoelectric cooler.

7. The apparatus according to claim 1, the broadband electromagnetic radiation comprising a broadband electromagnetic radiation bandwidth, the bandpass radiation filter comprising a filter bandwidth, the filter bandwidth being smaller than the radiation bandwidth.

8. The apparatus according to claim 7, the broadband electromagnetic radiation having a mean wavelength $\lambda_m$, wherein within a wavelength span $\Delta\lambda$ which includes the mean wavelength and with $\Delta\lambda/\lambda_m>0.05$ the spectral power does not vary by more than 0.8 dB.

9. The apparatus according to claim 1, wherein the mean wavelength is in the near infrared region.

10. The apparatus according to claim 1, wherein the semiconductor radiation source comprises a non-lasing superluminescent light emitting diode.

11. The apparatus according to claim 10, wherein the semiconductor radiation source further comprises a second non-lasing superluminescent light emitting diode, the second non-lasing superluminescent light emitting diode having an emission characteristics different from the emission characteristics of the first non-lasing superluminescent light emitting diode.

12. A system for generating electromagnetic radiation comprising a package of at least one superluminescent light emitting diode operable to emit primary electromagnetic radiation with a first bandwidth and a band pass filter capable of filtering the primary radiation to yield secondary radiation with a second bandwidth, which is smaller than the first bandwidth, an input of the band pass filter being optically coupled to an output of the at least one superluminescent light emitting diode, the package being thermally coupled to a thermoelectric cooler, the system further comprising a temperature sensor being in thermal contact with the package and a controller operable to control the thermoelectric cooler based on signals input from the temperature sensor.

13. The system according to claim 12, the primary electromagnetic radiation having a mean wavelength $\lambda_m$, wherein within a wavelength span $\Delta\lambda$ which includes the mean wavelength and with $\Delta\lambda/\lambda_m > 0.05$ the spectral power does not vary by more than 0.8 dB.

14. The system according to claim 12, comprising a fiber optically coupled to an output of said band pass filter, so that radiation output by the filter is couplable into the fiber, the fiber being at least one of a single mode fiber and of a polarization maintaining fiber.

15. The system according to claim 12 further comprising an optical arrangement including a fiber coil into which radiation output by the filter is couplable, the optical arrangement being capable of detecting a change of orientation of the fiber coil with respect to one spatial direction.

* * * * *